United States Patent [19]

Tune

[11] 4,322,483

[45] Mar. 30, 1982

[54] METHOD OF UTILIZING EMPTY ALUMINUM BEVERAGE CANS TO PROVIDE AN ENERGY SOURCE

[76] Inventor: Harold S. Tune, P.O. Box 6275, Penn Valley, Calif. 95946

[21] Appl. No.: 166,239

[22] Filed: Jul. 7, 1980

[51] Int. Cl.³ .......................................... H01M 10/44
[52] U.S. Cl. ...................................... 429/50; 429/94; 429/164; 429/27
[58] Field of Search .................................. 429/50–52, 429/164–174, 27–29, 94

[56] References Cited

U.S. PATENT DOCUMENTS

| | | | |
|---|---|---|---|
| 3,600,230 | 8/1971 | Stachurski et al. | 429/27 |
| 3,774,589 | 11/1973 | Kober | 429/8 X |
| 3,856,574 | 12/1974 | Amagi et al. | 429/218 |
| 3,953,239 | 4/1976 | Anderson | 429/120 |
| 3,963,519 | 6/1976 | Louie | 429/164 X |
| 4,048,389 | 9/1977 | Bubnick et al. | 429/164 X |
| 4,060,668 | 11/1977 | Goebel | 429/164 X |
| 4,146,678 | 3/1979 | Anthony et al. | 429/50 |
| 4,164,608 | 8/1979 | Coetzer | 429/50 |
| 4,211,830 | 7/1980 | Chevet | 429/27 |

Primary Examiner—Charles F. LeFevour
Attorney, Agent, or Firm—Manfred M. Warren; Robert B. Chickering; Glen R. Grunewald

[57] ABSTRACT

A method of utilizing empty aluminum cans to provide a source of electrical energy is disclosed. The method includes the steps of placing the cans in an electrolyte medium, preferably a salt water solution, and positioning a carbon depolarizer in the electrolyte to form an aluminum-air cell. A cup-shaped, inverted, carbon depolarizer and suitable mounting structure for positioning the depolarizer inside a beverage-type can is also disclosed.

9 Claims, 2 Drawing Figures

METHOD OF UTILIZING EMPTY ALUMINUM BEVERAGE CANS TO PROVIDE AN ENERGY SOURCE

BACKGROUND OF THE INVENTION

Although metal containers or cans are employed to store a wide variety of products, the packaging of beverages in cans has been particularly well-received by consumers because of the high degree of convenience and mobility. Initially, beverage cans were formed from ferrous metals, but in more recent years aluminum beverage cans have been developed. One of the primary advantages of the aluminum beverage can is that it can be recycled by the consumer after it is used. Recycling of aluminum beverage cans has become a significant factor in the packaging industry, but the vast majority of empty beverage cans are still regarded by most consumers as useless waste products. Thus, many consumers are unwilling to save the substantial numbers of beverage cans required to make recycling economically significant, or they are unwilling to go to the trouble of taking collections of aluminum cans to recycling centers or collection depots.

There is very little that a consumer can do on his or her own with an individual or small number of aluminum cans. Accordingly, most beverage-type cans are discarded, either in the garbage or thoughtlessly as litter at the convenience of the user. Although a new utility for beverage cans undoubtedly will not eliminate the problem of litter, it could have a significant effect if the average consumer had a meaningful use to which a relatively small number of beverage cans could be put without the need for specialized or expensive equipment.

Another area in which the average person feels relatively ineffectual and frustrated is in connection with making a meaningful contribution on an individual basis to the massive and complex energy problem facing the nation and the world. Generally, consumers must simply await technological breakthroughs by large corporations, governmental entities and the like. Other than individual responsibility for conservation, most of the energy related breakthroughs require sophisticated and expensive research. Even in the field of solar energy, the simplest solar energy conversion systems can be expensive enough so as to be beyond the means of many consumers and to give others considerable pause for thought.

While large corporations work on shale oil conversion, coal desulfurization, solar energy conversion, fusion, etc., the average person directs his efforts toward conservation, if any effort is made at all. When faced with the practical limitations of dealing effectively with the energy problem, the average person essentially does nothing.

OBJECTS OF THE INVENTION

Accordingly, it is an object of the present invention to provide a method of utilizing empty aluminum cans, which method can be employed by individuals to provide a source of energy for themselves.

It is a further object of the present invention to provide a method of utilizing empty aluminum beverage-type cans in order to form a lightweight, efficient and non-toxic battery.

Another object of the present invention is to provide apparatus, preferably in the form of a kit, for forming an efficient energy cell by using household products and waste aluminum cans.

Still a further object of the present invention is to provide a method for the formation of a low-cost energy source which can be rapidly and easily constructed without the use of specialized or expensive tools or equipment.

Another object of the present invention is provide an efficient battery which is formed from non-toxic electrolyte material, waste aluminum beverage cans and an inexpensive and reusable cathode terminal.

Still a further object of the present invention is to provide an inexpensive battery having a relatively high power-to-weight ratio and to provide a method for formation of the same.

The method and apparatus of the present invention have other objects and features of advantage which will be apparent from and are set forth in more detail in the accompanying drawing and the following description of the preferred embodiment.

SUMMARY OF THE INVENTION

The method of the present invention utilizes empty aluminum cans to provide a source of energy and includes, briefly, the steps of placing an empty aluminum can in contact with an electrolyte medium over a substantial area of the can, and positioning a porous carbon member in the medium in spaced relation to the can with one surface of the porous carbon member in contact with the electrolyte medium and an oppositely facing surface in contact with air to thereby create a metal-air electrical cell. In the preferred form the porous carbon member is provided by an inverted, cup-shaped, carbon depolarizer that is mounted inside the aluminum can with air trapped in the inverted carbon depolarizer cup. An individual consumer owning one or more cup-shaped, gas depolarizers, therefore, can form an efficient, lightweight, metal-air battery from aluminum beverage cans, salt and water.

DESCRIPTION OF THE PREFERRED EMBODIMENT

Figure 1:
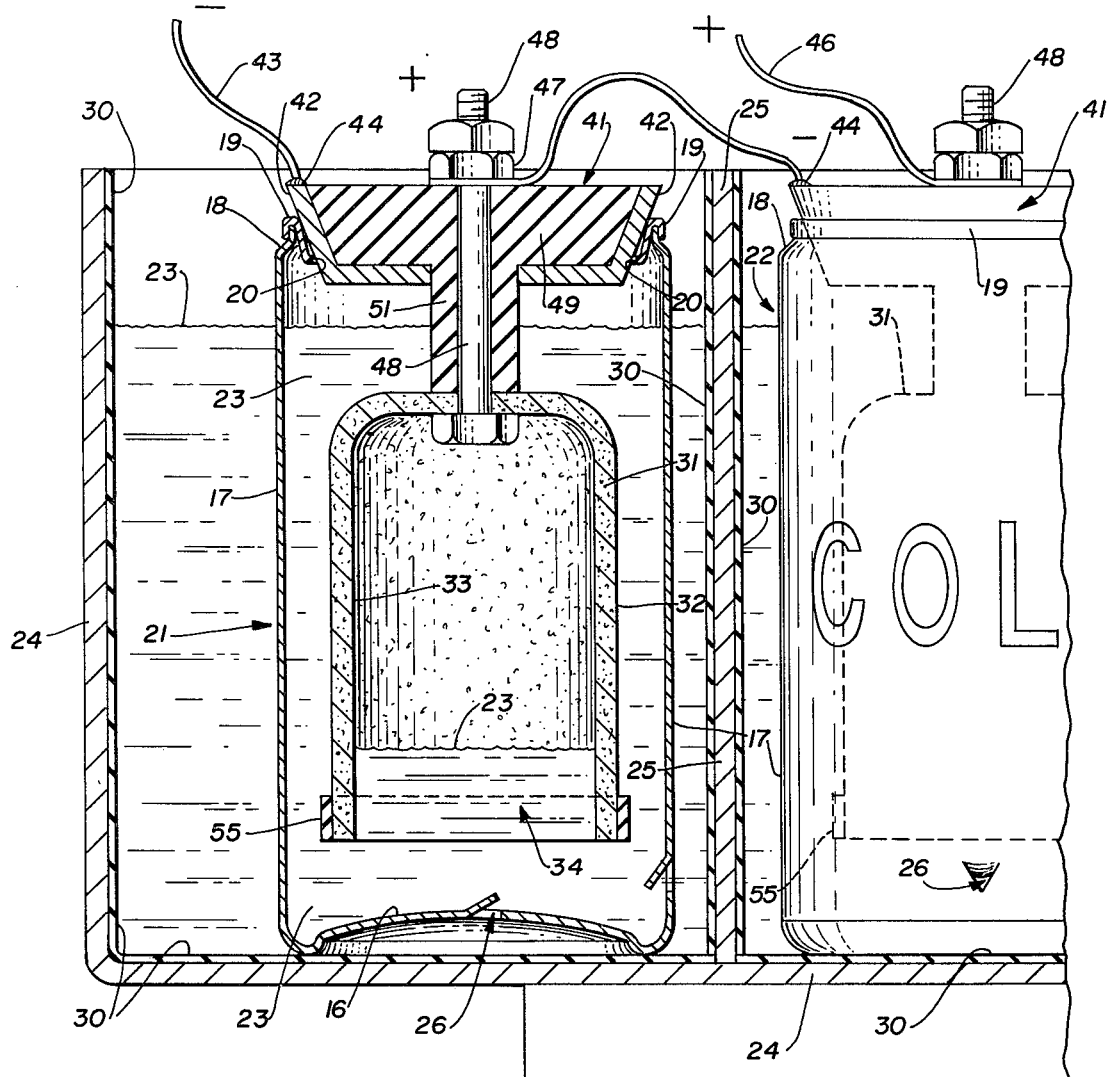
FIG. 1 is a fragmentary, side elevational view, partially in cross-section, of an aluminum can-based battery constructed in accordance with the method and using the apparatus of the present invention.

The present invention provides a partial solution to the problems of diminishing fuel supplies, overloaded and increasingly less dependable utility power systems, and the monumental waste of aluminum as contained in empty beverage cans. During the last 170 years only 5 metals have commonly been employed as electrodes in batteries, namely, lead, zinc, cadmium, nickel and iron. All of these metals have a relatively low energy output per pound (watt hours per pound), and they conventionally employ toxic or noxious electrolytes. Newer, lighter batteries using alkaline metals have improved the picture somewhat, and fuel cells will no doubt be a solution to the direct conversion of heat into electricity by electrochemical means. The practical application of fuel cells, however, is apparently still in the distant future.

Aluminum metal exceeds the electrode potential and many times exceeds the power-to-weight ratio of batteries manufactured from the five metals which have dominated the battery industry. It is not surprising, therefore, that it is possible to find aluminum-based batteries in the literature, but such prior batteries have been more theoretical in nature than practical in application. U.S. Pat. No. 3,953,239 discloses an aluminum and silver oxide battery using a potassium hydroxide electrolyte. U.S. Pat. No. 3,600,230 suggests the use of a porous but hydrophobic carbon electrode as a gas depolarizer in combination with an oxidable metal such as zinc, cadmium, magnesium or aluminum in the formation of a battery. U.S. Pat. No. 3,774,589 discloses an aluminum-activated carbon battery that is short circuited and used as a heat source. METAL-AIR BATTERIES, by D. P. Gregory and published by Mills & Boon Ltd. of London, England in 1972 similarly discloses the concept of aluminum-air batteries in which carbon gas depolarizers are employed. It is recognized, therefore, that the broad concept of an aluminum-air battery in which a carbon depolarizer is employed is not new.

Prior aluminum-air batteries have not gained widespread practical use because, notwithstanding the advantages, they are well-known to be poorly suited for recharging by reverse current flow. Additionally, such batteries are also known to have a relatively short shelf life because of local galvanic action with commonly used electrolytes. In addition to these disadvantages, aluminum is a relatively costly metal as compared to some of the other metals frequently employed in batteries. Thus, the theoretical feasibility of aluminum-air batteries has not led to any significant practical utility.

The method and apparatus of the present invention have overcome the problems long associated with aluminum-air batteries by recognizing that many of the defects and disadvantages can be overcome simply by employing empty aluminum cans. Aluminum beverage-type cans, for example, have been considered as essentially expendable or waste items in which the cost of the aluminum is insignificant. Thus, through the use of waste aluminum cans, the previously perceived disadvantage of the high cost of aluminum is overcome.

Additionally, the use of readily available electrolyte materials in combination with empty beverage cans allows the rapid construction of a battery just prior to its use. A highly effective battery, for example, can be created by using aluminum beverage cans and a sodium chloride (table salt) electrolyte. It is also a relatively simple matter to withdraw or remove the battery electrodes from a salt water electrolyte solution whenever the battery is not in use and to mechanically recharge the battery by replacing consumed aluminum cans periodically. Thus, the prior problems of an undesirably short shelf life and an inability to recharge can be overcome. The ability to separate the electrodes from the electrolyte without creating safety or toxicity problems overcomes the problem of continued galvanic action between the aluminum electrode and the electrolyte solution, and mechanical recharging avoids the necessity for recharging by reverse current flow.

Referring now to the drawing, the method of the present invention and resulting battery can be described in greater detail. Two empty, aluminum, beverage-type cans 21 and 22 are placed in contact with an electrolyte medium, such as electrolyte solution 23, over a substantial area of the cans. In the form of the invention shown in FIG. 1, electrolyte solution 23 is retained in a container 24 of a size sufficient to hold a plurality of cans in a side-by-side array. Container 24 is partitioned by divider 25, and the container and partition are coated with an electrically insulating layer 30 to provide two separate battery cells. Fiberglass resin, for example, makes a suitable insulating coating 30 for the present battery. In order to facilitate filling of the cans with the electrolyte solution it is preferable that an opening or openings 26 be formed in the bottom and/or sides of the cans proximate the bottom.

As will also be appreciated, it is possible in the method of the present invention to place the beverage can in contact with an electrolyte medium over substantial area of the can by simply filling the can with electrolyte. If this approach is used, obviously holes or openings 26 are not formed in the can, and it would also be possible to eliminate container 24. Each can would act as its own electrolyte container.

There are several advantages which accrue from use of a larger electrolyte container 24 and immersion of the cans as shown in the drawing. First, the area of the can immersed and in contact with the electrolyte solution is twice as large since both the inside and outside of the can are contacted by the electrolyte. Second, a single container 24 enables handling of a plurality of cans as a unit. Third, if the individual cans are used to contain the electrolyte, such containment will only be effective until the first opening or hole is produced in the can during operation of the battery. Since beverage can walls are usually relatively thin, the battery life may be unduly shortened by using the can as a container for the electrolyte. Fourth, it is a desirable aspect of the present invention to be able to remove the aluminum cans from the electrolyte solution when the battery is not in use. Mechanical removal means (not shown), such as insulated grid work with a handle, can be used to remove the cans from container 24. If the can is used as a container, the electrolyte will have to be dumped out of the can into another container or thrown away. Lastly, the use of a larger container 24 allows the bottom of the container 24 to be formed of a somewhat thicker and thermally conductive material which will facilitate heating of the electrolyte.

As shown in the drawing, container 24 is positioned on heating means 27, such as a wood stove, solar heater, camp fire, etc., to heat the electrolyte solution. It has been found that heating of the electrolyte solution to a temperature nearly boiling significantly enhances battery performance.

Aluminum cans 21 and 22 have a conventional structure as is commonly found in aluminum beverage-type cans. Thus, they are deep drawn with a dome-shaped bottom 16 and rather thin upwardly extending side walls 17 that terminate in an upper end 18. End 18 has been necked down for receipt of an aluminum end closure element 19, which typically has an opening scored therein that can be pressed inwardly to open the can by means of a tab (not shown) or the like.

It is preferable that waste, aluminum, beverage cans be employed in forming a metal-air battery using the method of the present invention. As will be appreciated, however, the cans used need not be "waste" or "beverage" cans. The cost advantage is lost if new cans are used, but the battery is operative. Aluminum containers are used for packaging products other than beverages now, and such use may well increase in the future.

Moreover, the presence of metals other than aluminum in the can is not necessarily fatal to the present method. In some instances, the can body may be aluminum while an end may be ferrous based. Since one step of the method of the present invention may be the removal of the can end, and since the upper can end may be positioned above the electrolyte, such a composite ferrous-aluminum can may be used.

Similarly, the presence of a relatively minor portion of non-aluminum alloying metals is common in most commercially available cans and does not significantly affect performance.

As used herein, therefore, the expressions "empty aluminum can" and "empty aluminum beverage-type can" shall include new and waste aluminum beverage and other containers, and it shall further include cans formed from a material, as contacted by the electrolyte, which includes no more than a relatively minor portion of non-aluminum metal.

In the preferred form of the present invention, the consumer will first cut an opening in one end of cans 21 and 22. In the form shown in the drawing, the end closure at the upper end of the can has been cut out along a circle 20 to provide an open topped can. It is preferable to cut the top of the can open, rather than bottom 16, because the bead along which enclosure 19 is joined to the necked down portion 18 of the can retains greater structural rigidity in the relatively thin-walled can than results if the domed bottom 16 of the can is removed. It should be noted, however, that the battery of the present invention will still function if the bottom 16 of the can is removed.

Some aluminum beverage cans are coated on the inside with a coating used to prevent chemical reaction between the beverage and the aluminum in the can. For such coated cans the effective area of the can contacted by the electrolyte will be reduced unless the coating is removed. Since these coatings are thin, it is a simple matter once the can end is removed to use a piece of sand paper, a wire brush, a can opener or even a knife to scrape off most of the coating.

The metal-air cells of the battery of the present invention are then formed by the step of positioning a carbon depolarizer 31 in electrolyte 23 in spaced relation to aluminum beverage cans 21 and 22. The carbon depolarizer must be positioned with one surface, preferably an outside surface 32, in contact with electrolyte solution 23 and a generally oppositely facing surface, preferably inside surface 33, in contact with air. The carbon depolarizer electrode 31 provides a three-phase junction between the air, electrolyte and carbon, which occurs within the electrode. The electrode is preferably a somewhat porous and yet hydrophobic carbon gas depolarizer of the type well known for use in metal-air batteries, see, for example, U.S. Pat. No. 3,856,574. Carbon depolarizers have the advantage over solid carbon electrodes of being able to maintain voltaic action without the build-up of a hydrogen barrier on the electrode.

In order to provide for compactness and also to enhance performance, the carbon depolarizer of the present invention is preferably formed as a cup-like member which is inverted and positioned inside cans 21 and 22 so as to trap air up under the cup. Thus, electrolyte will be seen in the drawing to enter open end 34 of the cup only a small distance. The combination of aluminum can 21 and carbon depolarizer 31 in electrolyte solution 23, therefore, forms a metal-air battery that can provide a significant source of electrical energy to the user.

It is a further important feature of the present invention that in the aluminum-air cell the electrolyte 23 can be essentially a non-toxic electrolyte. Thus, a highly efficient cell can be formed if sodium chloride (table salt) is mixed with water to provide the electrolyte. Other commonly available household chemicals can also be used to form a suitable electrolyte solution for an aluminum-air cell or can be used to enhance the cell performance, for example, sodium borate (borax), sodium bicarbonate (baking soda) and sodium hydroxide (lye). Some of these electrolytes would have undesirable toxic properties, and table salt makes a highly efficient electrolyte having a near neutral pH.

The average consumer, therefore, need not have special chemicals in order to utilize the method of the present invention in forming a metal-air cell or battery. The only component of the basic battery cell which is not conventionally found around the house is the carbon depolarizer. Once the consumer is provided with such a depolarizer, and the depolarizer mounting means, as will be more fully described hereinafter, it is a simple and inexpensive matter to form a single cell or a battery. All the consumer needs to do is mix table salt and water in container 24 to form an electrolyte solution. Thereafter, at least one of the ends of one or more aluminum cans is removed, and any internal abrasive coating may be abrasively removed. The carbon gas depolarizer then can be mounted inside the cans, and the cans and depolarizer immersed in the electrolyte solution. If there is more than one can and depolarizer in the volume bound by partition 25, the cans and depolarizers on one side of partition 25 and forming a single cell should be coupled in parallel. Similarly, the cans and depolarizers on the other side of partition 25 should be coupled in parallel, and the cells should be connected, as shown in the drawing, in series.

During use, the user may optionally heat the electrolyte solution to enhance battery performance, and when the battery is no longer in use, the cans and carbon electrodes may be removed from the electrolyte solution to stop the voltaic action, to replenish the air under the depolarizer cups, and to prevent deterioration of the battery when not in use. When an inverted cup form of depolarizer is used, it is recognized that it will be necessary to periodically replenish the air under the cup. This can easily be done at the end of the period of use by removing the depolarizer and then replacing it when the battery is to be used again. Since the electrolyte is merely saltwater, storing the initially wet electrodes when not in use does not present a dangerous problem, and the electrolyte solution can either be disposed of or stored in container 24 without posing a health or safety problem.

Mounting of the cup-like carbon depolarizer 31 in spaced relation to the aluminum can is preferably accomplished by securing the cup-like electrode to mounting means, generally designated 41, formed to position the electrode inside can 21 in spaced apart, concentric relationship to the can. As shown in FIG. 1, mounting means 41 can be advantageously formed as a disk-like member having a tapered outer surface 42 dimensioned to extend into and engage the upper end 18 of the aluminum beverage can. Thus, the tapering of outer surface 42 of mounting member 41 allows the mounting member to be wedged into the open end of the can. The tapering of the surface will also accommodate variations in the manner in which the can end is cut open at edge 20.

It is an important feature of the present invention to provide a kit which may be used by the consumer in forming batteries in accordance with the present method from commonly available household products and empty or waste aluminum beverage cans. Thus, the mounting means 41 is preferably provided with the necessary electrically conductive paths that lead to terminals or conductors which may be connected to an electrical load. This can be accomplished by forming tapered surface 42 as an electrically conductive surface and connecting conductor means 43 to conductive surface 42, for example by soldering at 44. Additionally, the mounting means will include a second electrical conductor 46 that is coupled by a nut 47 and an electrically conductive bolt 48, or another suitable fastener means that is used to secure carbon electrode 31 to an electrically insulating annular member 49. As will be seen, a neck portion 51 of insulating member 49 extends down below the mounting means so as to position the cup-shaped electrode in spaced relation to the electrically conductive surface 42.

This construction affords an electrical path from electrode 31 through bolt 48 to conductor 46, which is the positive side or terminal of the cell. The negative terminal is insulated by annular insulator 49 and neck 51 from the positive terminal so that an electrical path is provided between can 21 and conductive surface 42 to electrical conductor 43.

Additionally, in order to avoid short circuiting, it is preferable that the method of the present invention include the step of mounting electrically insulating means 55 to an outside surface 32 of the carbon depolarizer proximate open end 34. Insulating means 55 may, for example, be an electrically insulating tape that is adhesively mounted proximate the open end 34 of the carbon electrode. Alternatively, an electrically insulating O-ring can be mounted on the outside of the carbon depolarizer to both insulate and space the carbon depolarizer from the can.

Thus, a kit for formation of the metal-air cell of the present invention from an empty aluminum beverage can and an electrolyte solution made from table salt would include: the carbon depolarizer 31, mounting means 41, and electrical conductor means (such as conductors 43 and 46) electrically coupled to be isolated from each other and yet coupled to permit withdrawal of energy from the cell when the carbon depolarizer is mounted in the can.

While it is preferable to form the carbon depolarizer as a cup-shaped member that can be mounted inside of a beverage can, alternate electrode constructions are suitable for use with the method of the present invention. It would be possible, for example, to position electrode 31 in side-by-side relation to can 21. This obviously has the disadvantages of lack of compactness and a separation and lack of uniformity in the spacing between the can and the carbon depolarizer. Current output of such cells is known to be adversely affected by increased spacing between the can and the carbon depolarizer.

Alternatively, the cup-shaped carbon depolarizer could be mounted inside the can with open end 34 facing upwardly. This would require a longer mounting bolt 48 and neck structure 51, but it would still provide a structure in which the inside of the cup was exposed to air while the outside was contacted by electrolyte. The advantage of an inverted cup is that the air trapped inside the cup is under a hydrostatic pressure. This hydrostatic pressurizing of the air enhances cell performance over a cell in which the cup is open to the atomsphere.

Still another alternative embodiment would be to form the carbon gas depolarizer as a plate and mount the same to a side wall of the container having an opening therein so that the carbon electrode would act as a portion of the side wall. In this configuration one side of the electrode would be exposed to and contacted by the electrolyte 23, while the opposite side would be in contact with air to provide the three phase junction of air, electrolyte and carbon.

Still a further alternative would be to form the carbon depolarizer as a very large cup having an inside diameter dimensioned for receipt of can 21. The large depolarizer could then be used as the container for the electrolyte and the can positioned inside the carbon depolarizer. This approach has the disadvantage of requiring an unnecessarily large and expensive carbon depolarizer.

Figure 2:
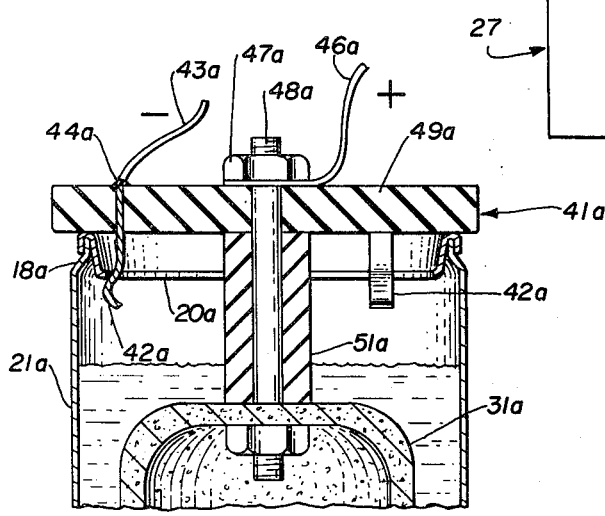
FIG. 2 is a fragmentary, side elevational view of an alternative embodiment of electrode mounting means.

In FIG. 2 alternate mounting means for the carbon depolarizer is shown. The reference numerals of the elements corresponding to FIG. 1 include the letter "a". Thus, depolarizer 31a is mounted to upper end 18a of aluminum can 21a by mounting means 41a. In the form of the invention shown in FIG. 2, a plurality of spring slips 42a (preferably three) are mounted to a plexiglass member 49a at a diameter permitting them to be urged past the edge 20a of the open topped can so as to resiliently snap into engagement under edge 20a.

At least one of clips 42a is formed of an electrically conductive material and coupled at 44a to conductor 43a to provide the negative terminal of the cell. The positive terminal can again be provided by electrically conductive bolt 48a connected to conductor 46a by nut 47a. An annular spacer element 51a can be used to space the cup below member 49a. The spacer 51a can be integrally formed with 49a or formed as separate washer, as shown in FIG. 2, and it need not be an electrically insulating material.

The alternate mounting means of FIG. 2 affords some advantages in the manufacture of the mount and enhances manipulation and spacing of the carbon depolarizer.

EXAMPLE 1

A single cell was formed using one twelve-ounce, aluminum beverage can and a saturated salt solution for an electrolyte. The material used to form a cup-shaped porous carbon electrode was obtained from Pure Carbon Corporation of St. Marys, Pa., and the depolarizer material carried the product designation FC-13. The electrode was mounted inside the can and had a spacing from the can of a few millimeters. The closed circuit voltage was about 0.6 volts. The current output varied from about 90 to about 400 milliamps, depending upon the electrolyte temperature, which varied from about 70° F. to about 200° F. The cell was operated continuously in the above temperature range for about 2 hours and deterioration of the can during that time was barely perceptible. The can and electrode were removed from the electrolyte and stored for 12 hours and then immersed again into the electrolyte solution. The current and voltage output were essentially unchanged, and the cell was operated for an additional 2 hours. Deterioration of the can was perceptible at this time, and a salt deposit on the carbon depolarizer was present, but could be easily washed off.

EXAMPLE 2

A "Six Pack" battery was formed by connecting together three cells in series as shown in the drawing, with three pairs of cans together in each cell. Each can in the cell was connected in parallel and the pairs comprising the cell were coupled to each other in series to operate a 3.7 volt, 0.6 amps, sealed beam lamp manufactured by General Electric Company for the U.S. Coast and Geodetic Survey. The carbon electrodes were the same as in the first example, and the electrolyte solution was a saturated salt solution to which a few hundred milligrams of sodium hydroxide had been added to increase the cell voltage. The electrolyte was heated to about 200° F. by a hot plate. A two "Six Pack" battery using a salt solution without sodium hydroxide could also have been used to power the light. The battery was operated for 2 hours, during which the lamp maintained a steady and bright light. The cans and carbon electrodes were then removed and inspected, and while deterioration of the cans was perceptible, the carbon electrodes appeared intact, although they did have a visually perceptible salt on them that could be easily removed by rinsing in water.

What is claimed is:

1. A method of utilizing empty aluminum cans to provide a source of electrical energy comprising the steps of:
   (a) placing an empty aluminum can in contact with an electrolyte medium over a substantial area thereof; and
   (b) positioning a cup-like carbon depolarizer inverted in said electrolyte medium in spaced relation to said aluminum can with one surface of said carbon depolarizer in contact with said electrolyte medium and an oppositely facing surface thereof in contact with air;
   whereby the combination of said aluminum can, said carbon depolarizer, and said electrolyte medium form a metal-air cell providing a source of electrical energy.

2. The method of utilizing empty aluminum cans as a source of energy as defined in claim 1, and the additional step of:
   providing said electrolyte medium as an aqueous sodium chloride solution.

3. The method of utilizing empty aluminum cans as a source of energy as defined in claim 1 wherein,
   said positioning step is accomplished by contacting an outside surface of the cup-like carbon depolarizer with said liquid electrolyte medium and exposing an inside surface to air.

4. The method of utilizing empty aluminum cans as defined in claim 1 wherein,
   said positioning step is accomplished by inverting the cup-like carbon depolarizer and immersing said cup-like carbon depolarizer in said liquid electrolyte medium in an inverted position to trap air under said cup-like carbon depolarizer.

5. The method of utilizing empty aluminum cans as a source of energy as defined in claim 1, and the additional steps of:
   selecting an aluminum beverage can; and
   said positioning step is accomplished by mounting the cup-like carbon depolarizer in concentric spaced relation to said can.

6. The method of utilizing empty aluminum cans as a source of energy as defined in claim 5 and the step of:
   removing an internal coating from the inside of said aluminum beverage can.

7. The method of utilizing empty aluminum cans as a source of energy as defined in claim 1, and the additional step of:
   selecting an aluminum beverage can;
   prior to said placing and positioning steps, placing a liquid electrolyte medium in said beverage can; and
   heating said liquid electrolyte medium to a temperature proximate the boiling point thereof during withdrawal of electrical energy therefrom to enhance the rate of energy withdrawal by applying heat to said beverage can.

8. The method of utilizing empty aluminum cans as a source of energy as defined in claim 1, and the additional step of:
   removing said aluminum can contact with said electrolyte medium when said cell is not in use.

9. A method of utilizing empty aluminum cans, a carbon depolarizer kit and commonly available household chemicals to provide a low temperature, mechanically rechargeable, safe, source of electrical energy comprising the steps of:
   (a) forming an electrolyte solution from water and a water soluable household chemical;
   (b) removably placing an empty aluminum can in contact with said electrolyte solution over a substantial area thereof; and
   (c) removably positioning a cup-like carbon depolarizer inverted in said electrolyte solution in spaced relation to said aluminum can with one surface of said carbon depolarizer in contact with said electrolyte medium and an oppositely facing surface thereof in contact with air;
   whereby the combination of said aluminum can, said carbon depolarizer, and said electrolyte solution form a metal-air cell providing a low temperature, mechanically rechargeable, safe, source of electrical energy.

* * * * *